(12) United States Patent
Saravanan et al.

(10) Patent No.: US 12,446,564 B2
(45) Date of Patent: Oct. 21, 2025

(54) AGRICULTURAL SPRAYER UNIT AND A SPRAY DEFLECTING MECHANISM THEREOF

(71) Applicant: MAHINDRA AND MAHINDRA, Chengalpattu (IN)

(72) Inventors: N Saravanan, Tamil Nadu (IN); Rajeswar Kuchimanchi, Tamil Nadu (IN); Aravind Bharadwaj, Tamil Nadu (IN); Shankar Venugopal, Tamil Nadu (IN); Ananda Kundu, Tamil Nadu (IN); Ram Mohan Sitaraman, Tamil Nadu (IN); Dayan Sheriff, Tamil Nadu (IN)

(73) Assignee: MAHINDRA AND MAHINDRA, Chengalpattu (IN)

( * ) Notice: Subject to any disclaimer, the term of this patent is extended or adjusted under 35 U.S.C. 154(b) by 899 days.

(21) Appl. No.: 17/278,183

(22) PCT Filed: Jul. 10, 2019

(86) PCT No.: PCT/IN2019/050017
§ 371 (c)(1),
(2) Date: Mar. 19, 2021

(87) PCT Pub. No.: WO2020/110135
PCT Pub. Date: Jun. 4, 2020

(65) Prior Publication Data
US 2022/0117210 A1    Apr. 21, 2022

(30) Foreign Application Priority Data

Nov. 26, 2018   (IN) .............................. 201841044509

(51) Int. Cl.
*A01M 7/00* (2006.01)
*A01C 23/00* (2006.01)
(Continued)

(52) U.S. Cl.
CPC ......... *A01M 7/0067* (2013.01); *A01C 23/008* (2013.01); *A01C 23/047* (2013.01);
(Continued)

(58) Field of Classification Search
CPC .......... B05B 1/28; B05B 12/32; B05B 12/34; B05B 12/35
(Continued)

(56) References Cited

U.S. PATENT DOCUMENTS

| 4,139,156 A | * | 2/1979 | Field | A01M 7/0089 239/124 |
| 4,273,285 A | * | 6/1981 | Scholbrock | A01M 7/006 239/164 |

* cited by examiner

*Primary Examiner* — Christopher S Kim
(74) *Attorney, Agent, or Firm* — Maschoff Brennan (57) ABSTRACT

An agricultural sprayer unit 700 and a spray deflecting mechanism 70 thereof for the sprayer unit 700 is provided. The agricultural sprayer unit 700 includes a control valve 702, a controller unit 703, a plurality of sprayer nozzles 704, a sprayer tank 706, a sprayer pump 708 and a spray deflecting mechanism 70. The spray deflecting mechanism 70 includes a spray defecting arrangement 72A and a collecting means 70T. The spray deflecting arrangement 70A is adapted to be moved between a deflecting position in which the spray deflecting arrangement 72A is adapted to deflect and re-direct unutilized dispensed fluid from at least one sprayer nozzle 704 to the collecting means 70T thereby restricting wastage of chemical agent/biological agent where the spraying is not required and also to restrict spraying of chemical agent/biological agent to healthy plants.

8 Claims, 6 Drawing Sheets

(51) Int. Cl.
 *A01C 23/04* (2006.01)
 *B05B 12/32* (2018.01)
 *B05B 14/00* (2018.01)
(52) U.S. Cl.
 CPC ........... *A01M 7/0042* (2013.01); *B05B 12/32* (2018.02); *B05B 14/00* (2018.02)
(58) Field of Classification Search
 USPC ....... 239/103, 120, 121, 122, 503, 505, 507, 239/508, 509–513
 See application file for complete search history.

Fig. 6

AGRICULTURAL SPRAYER UNIT AND A SPRAY DEFLECTING MECHANISM THEREOF

CROSS REFERENCE TO RELATED APPLICATION

This application is based on and derives the benefit of Indian Application 201841044509 filed on 26 Nov. 2018, the contents of which are incorporated herein by reference.

TECHNICAL FIELD

The embodiments herein relate to an agricultural sprayer unit and a spray deflecting mechanism for an agricultural sprayer unit, which deflects and re-directs unutilized dispensed fluid from sprayer nozzles to a sprayer fluid tank of the agricultural sprayer unit.

BACKGROUND

Agricultural sprayer is used to spray any of chemical agent and biological agent to the crops cultivated in a region to treat the disease in crops or to provide nutrition to the crops. A conventional agricultural sprayer mainly comprises a tank which is used to store any of chemical agent and biological agent, a plurality of nozzles which are used to spray the chemical/biological agent to crops, and a mechanical pump which is usually driven by a power take-off shaft (PTO shaft) of a vehicle to pump any of chemical agent and biological agent from the tank to the plurality of nozzles. Each nozzle of the conventional agricultural sprayer unit is used to spray any of chemical agent and biological agent in directions irrespective of the plants to be treated which in turn would overload other healthy plants with chemical agents which is undesirable and also results in wastage of chemical agent/biological agent, increased cost for refilling chemical agent/biological agent in tank and also results in contamination of water, soil and air which is undesirable.

Therefore, there exists a need for an agricultural sprayer unit and a spray deflecting mechanism for deflecting and re-directing unutilized dispensed fluid from sprayer nozzles to a sprayer fluid tank in an agricultural sprayer unit, which obviates the aforementioned drawbacks.

OBJECTS OF THE DISCLOSED EMBODIMENTS

The principal object of an embodiment of this invention is to provide an agricultural sprayer unit.

Another object of an embodiment of this invention is to provide a spray deflecting mechanism for deflecting and re-directing unutilized dispensed fluid from sprayer nozzles to a sprayer fluid tank in an agricultural sprayer unit.

Yet, another object of an embodiment of this invention is to provide an agricultural sprayer unit, which regulates fluid flow from sprayer pump to sprayer nozzles.

A further object of an embodiment of this invention is to provide an agricultural sprayer unit, which eliminates spraying of chemical agent/biological agent from sprayer nozzles to healthy plants, reduces wastage of chemical/biological agent and reduces cost in refilling chemical agent/biological agent in tank and also reduces contamination of water, soil and air.

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

The embodiments of the invention are illustrated in the accompanying drawings, throughout which like reference letters indicate corresponding parts in the various figures. The embodiments herein will be better understood from the following description with reference to the drawings, in which:

FIG. 1 depicts a schematic view of an agricultural sprayer unit coupled to an agricultural vehicle, according to an embodiment of the invention as disclosed herein;

FIG. 2 depicts a schematic view of an agricultural sprayer unit with a spray deflecting mechanism, according to one embodiment of the invention as disclosed herein;

FIG. 3 depicts a schematic view of an agricultural sprayer unit with a spray deflecting mechanism, according to another embodiment of the invention as disclosed herein;

FIG. 4 depicts a schematic view of an agricultural sprayer unit with a spray deflecting mechanism, according to another embodiment of the invention as disclosed herein;

FIG. 5 depicts a schematic view of an agricultural sprayer unit with a spray deflecting mechanism, according to another embodiment of the invention as disclosed herein; and FIG. 6 depicts a schematic view of an agricultural sprayer unit with a spray deflecting mechanism, according to another embodiment of the invention as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an agricultural sprayer unit and a spray deflecting mechanism for deflecting and re-directing unutilized dispensed fluid from sprayer nozzles to a sprayer fluid tank in an agricultural sprayer unit. Referring now to the drawings, and more particularly to FIGS. 1 through 6, where similar reference characters denote corresponding features consistently throughout the figures, there are shown embodiments.

FIG. 1 depicts a schematic view of an agricultural sprayer unit 700 coupled to an agricultural vehicle V, according to an embodiment as disclosed herein. In an embodiment, the agricultural sprayer unit 700 is used to spray at least one of chemical agent and biological agent to any of crops, plants and trees in a region to at least treat the disease in crops and provide nutrition to the crops. In an embodiment, the agricultural sprayer unit 700 includes at least one control valve 702, a controller unit 703, a plurality of sprayer nozzles 704, a sprayer fluid tank 706, a sprayer pump 708 and a spray deflecting mechanism 70. For the purpose of this description and ease of understanding, the agricultural sprayer unit 700 is explained herein with respect to the sprayer unit used in a grape yard. However, it is also within the scope of the invention to use the agricultural sprayer unit 700 to spray at least one of chemical agent and biological agent to any of crops, plants and trees in any other orchards or any other region. The agricultural sprayer unit 700 is configured to be powered by an agricultural vehicle V such as tractors. However, it is also within the scope of the invention to provide the agricultural sprayer unit 700 to be powered by any other vehicles or machines without otherwise deterring the intended function of the agricultural sprayer unit 700 as can be deduced from the description and corresponding drawings. The spray deflecting mechanism 70 of the agricultural sprayer unit 700 is adapted to selectively deflect and re-direct unutilized dispensed fluid from corresponding sprayer nozzles 704 to the sprayer fluid tank 706 so as to restrict the spraying of chemical agent and/or biological agent to healthy plants and to reduce wastage of chemical agent and/or biological agent where spraying is not required and also to reduce contamination of soil, water and air.

In one embodiment, the agricultural sprayer unit 700 includes at least one control valve 702. The control valve 702 is used to regulate the fluid flow from the sprayer pump 708 to the plurality of sprayer nozzles 704 based on the input received from the controller unit 703. The control valve 702 is provided in fluid communication with the sprayer pump 708, the sprayer fluid tank 706 and the plurality of sprayer nozzles 704. The control valve 702 is provided in communication with the controller unit 703. It is also within the scope of the invention to provide the control valve 702 in communication with a controller unit of the vehicle V. In an embodiment, the control valve 702 is at least a servo valve. In another embodiment, the control valve 702 is at least one of a solenoid valve and a directional valve. It is also within the scope of the invention to provide any other type of control valves for controlling the fluid flow to the plurality of sprayer nozzles 704 without otherwise deterring the intended function of the control valve 702 as can be deduced from the description and corresponding drawings.

In another embodiment, the agricultural sprayer unit 700 includes a plurality of control valves, where each control valve is provided in fluid communication with corresponding each sprayer nozzle 704. Each control valve 702 is used to regulate the fluid flow from the sprayer pump 708 to corresponding each sprayer nozzle 704 based on the input received from the controller unit 703. Each control valve 702 is provided in fluid communication with the sprayer pump 708, the sprayer fluid tank 706 and corresponding each sprayer nozzle 704. Each control valve 702 is provided in communication with the controller unit 703. It is also within the scope of the invention to provide each control valve 702 in communication with a controller unit of the vehicle V.

In an embodiment, the controller unit 703 is used to actuate the control valve 702 based on the information received by the controller unit 703. The controller unit 703 is provided in communication with at least one electronic device to receive information about at least one of type of crop disease, type of disease severity and crop location co-ordinates. The electronic device is at least one of a smart phone and a computing means. It is also within the scope of the invention to provide a personal computer, a notebook, a tablet, desktop computer, a laptop, a handheld device or any other electronic device for providing the information to the controller unit 703. The controller unit 703 is provided in communication with at least one control valve 702. The controller 703 can include a processor, a micro-controller, a memory, a storage unit, an input output unit, a display unit and so on. The controller 703 can be configured to analyze a prescription plan for at least one region under cultivation. The prescription plan may be generated based on imagery information, sensory information and geo-position information corresponding to region under cultivation. The controller unit 703 is used to determine the level of chemical agent/biological agent in the sprayer fluid tank 706 through sensors and accordingly provides inputs to the user.

The plurality of sprayer nozzles 704 is used to spray the fluid (chemical agent and/or biological agent) to at least one of crops, plants and trees in a region. In an embodiment, each sprayer nozzle 704 is provided in fluid communication with at least one control valve 702. The plurality of sprayer nozzles 704 includes a plurality of left side sprayer nozzles (not shown) and a plurality of right side sprayer nozzles (not shown). It is also within the scope of the invention to provide the plurality of sprayer nozzles 704 in any other configuration, pattern and orientation according to the spraying requirement without otherwise deterring the intended function of the sprayer nozzles 704 as can be deduced from the description and corresponding drawings.

The sprayer fluid tank 706 is used to store at least one of at least one chemical agent and at least one biological agent. In one embodiment, the sprayer fluid tank 706 includes at least one chamber (not shown) which is used to store at least one of at least one chemical agent and at least one biological agent. In another embodiment, the sprayer fluid tank 706 includes a plurality of chambers (not shown), where one chamber (not shown) is used to store a first chemical agent, another chamber (not shown) is used to store a second chemical agent, another chamber (not shown) is used to store a first biological agent, another chamber is used to store a second biological agent, and similarly other chambers are used to store different chemical agent or biological agents. The sprayer fluid tank 706 is provided in communication with the sprayer pump 708 and at least one control valve 702.

In an embodiment, the sprayer pump 708 is used to pump the fluid from at least one chamber in sprayer fluid tank 706 to at least one sprayer nozzle 704 through at least one control valve 702. The sprayer pump 708 is provided in fluid communication with at least one chamber in the sprayer fluid tank 706. The sprayer pump 708 is provided in fluid communication with at least one sprayer nozzle 704 through at least one control valve (703).

FIG. 2 depicts a schematic view of an agricultural sprayer unit 700 with a spray deflecting mechanism 70, according to one embodiment of the invention as disclosed herein. In an embodiment according to FIG. 2, the spray deflecting mechanism 70 is used to selectively deflect and re-direct unutilized dispensed fluid from corresponding at least one sprayer nozzle (704) to the sprayer fluid tank 706 to restrict the spraying of chemical agent and/or biological agent to healthy plants and to reduce wastage of chemical agent and/or biological agent where spraying is not required, and also to reduce contamination of soil, water and air. The spray deflecting mechanism 70 includes a spray deflecting arrangement 72A, at least one collecting means 70T and a plurality of pipes (not shown). In an embodiment according to FIG. 2, the spray deflecting arrangement 72A includes a spray deflecting element 72 adapted to be moved to a deflecting position in which the spray deflecting element 72 is adapted to disposed closer to the plurality of sprayer nozzles 704 and adapted to deflect and re-direct unutilized dispensed fluid from the plurality of sprayer nozzles 704 to the collecting means (not shown). The spray deflecting element 72 is moved to a stowed position in which the spray deflecting element 72 is disposed away from the plurality of sprayer nozzles 704. The spray deflecting element 72 is hinged to a mounting means (door frame). In an embodiment, the spray deflecting element 72 is at least a cover having a concave inner portion adapted to be coated with a surfactant such as hydrophobic agent. It is also within the scope of the invention to coat the concave inner portion of the spray deflecting element 72 with any other surfactant. The surfactant is used to reduce surface energy of the concave portion of the spray deflecting element 72. The spray deflecting element 72 is moved manually or through an actuator (not shown).

Figure 1:
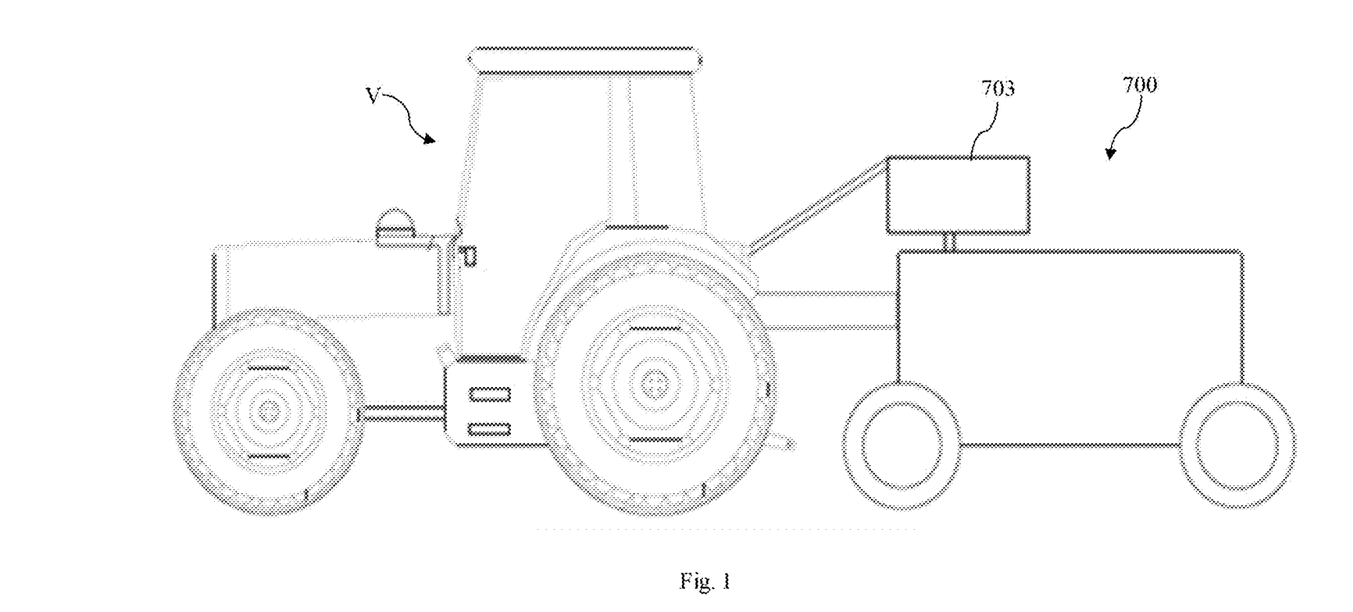
Figure 2:
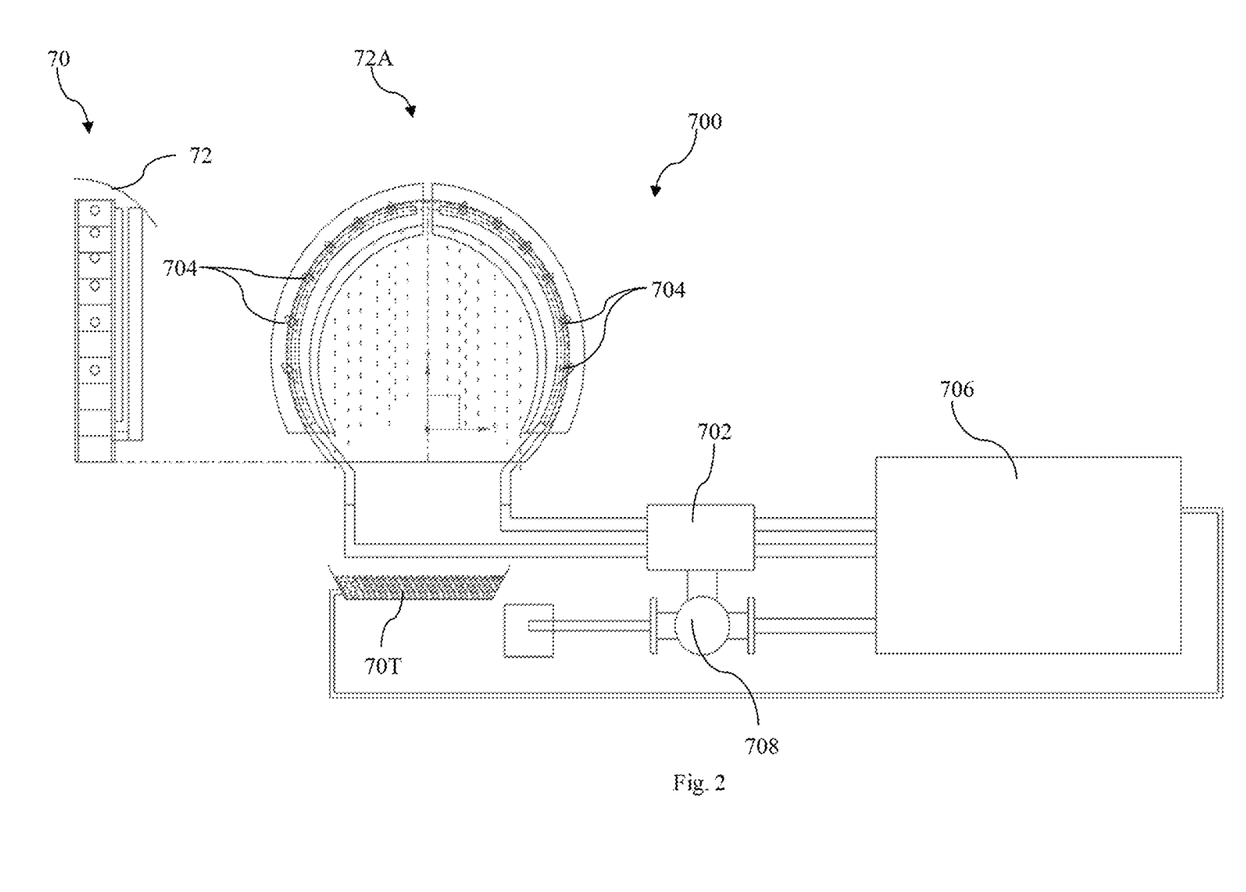
Figure 3:
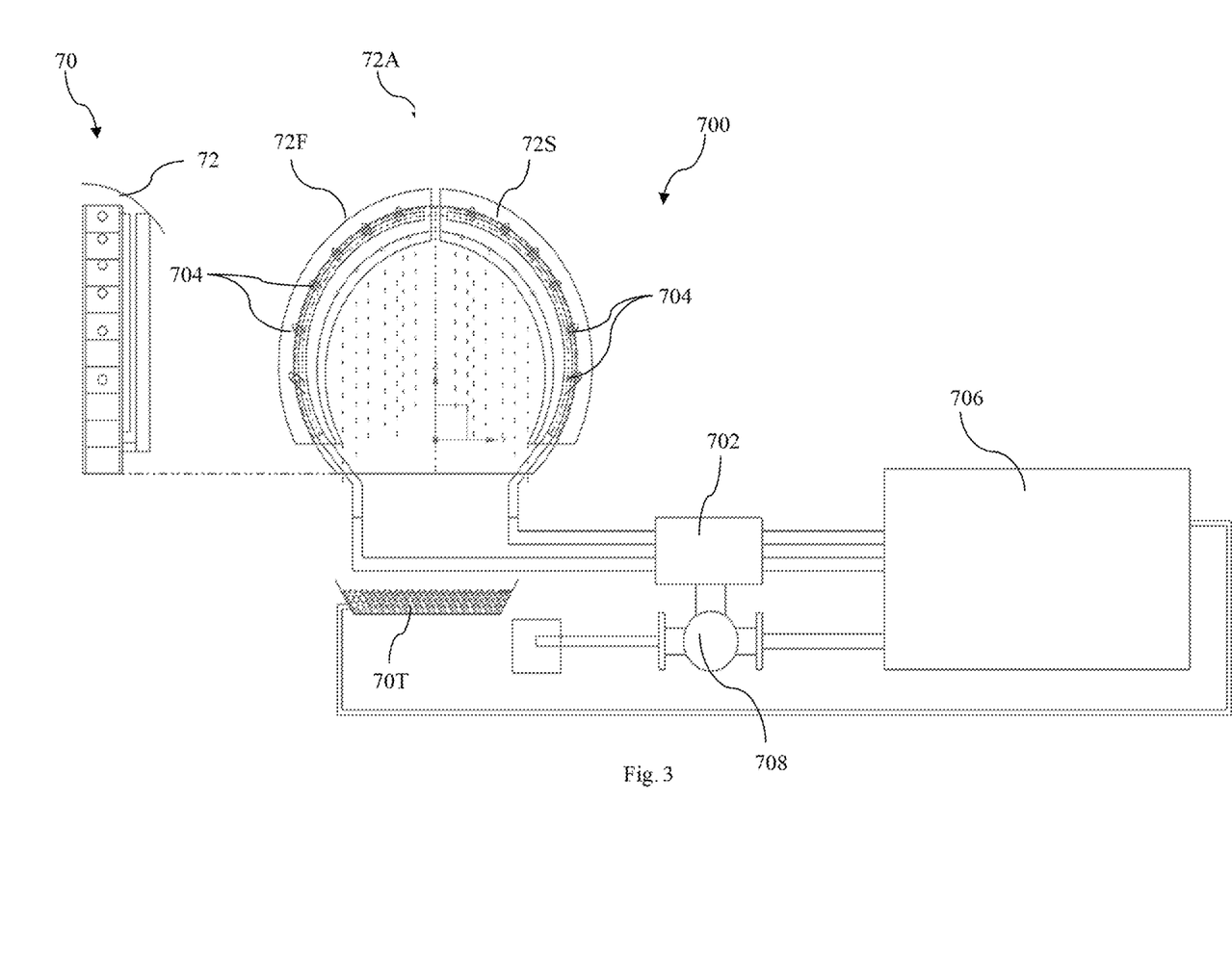

FIG. 3 depicts a schematic view of an agricultural sprayer unit 700 with a spray deflecting mechanism 70, according to another embodiment of the invention as disclosed herein. In another embodiment according to FIG. 3, the spray deflecting mechanism 70 includes a spray deflecting arrangement 72A, at least one collecting means 70T, and a plurality of pipes (not shown). In an embodiment according to FIG. 3, the spray deflecting arrangement 72A includes a first spray deflecting element 72F and a second spray deflecting element 72S (as shown in FIG. 3). The first spray deflecting element 72F and the second spray deflecting element 72S are adapted to be moved between a deflecting position in which the spray deflecting elements (72F and 72S) are disposed closer to corresponding sprayer nozzles 704 and adapted to deflect and re-direct unutilized dispensed fluid from corresponding sprayer nozzles 704 to the collecting means 70T, and a stowed position in which the spray deflecting elements (72F and 72S) are disposed away from corresponding sprayer nozzles 704. In an embodiment, the spray deflecting elements (72F and 72S) are covers provided with concave inner portion adapted to be coated with a surfactant such as hydrophobic agent. It is also within the scope of the invention to coat the concave inner portion of the spray deflecting elements (72F and 72S) with any other surfactant. The spray deflecting elements (72F and 72S) are hinged to corresponding mounting means (door frame). In an embodiment, the spray deflecting elements (72F and 72S) are moved manually. In another embodiment, the spray deflecting elements (72F and 72S) are automatically moved by an actuator.

Figure 6:
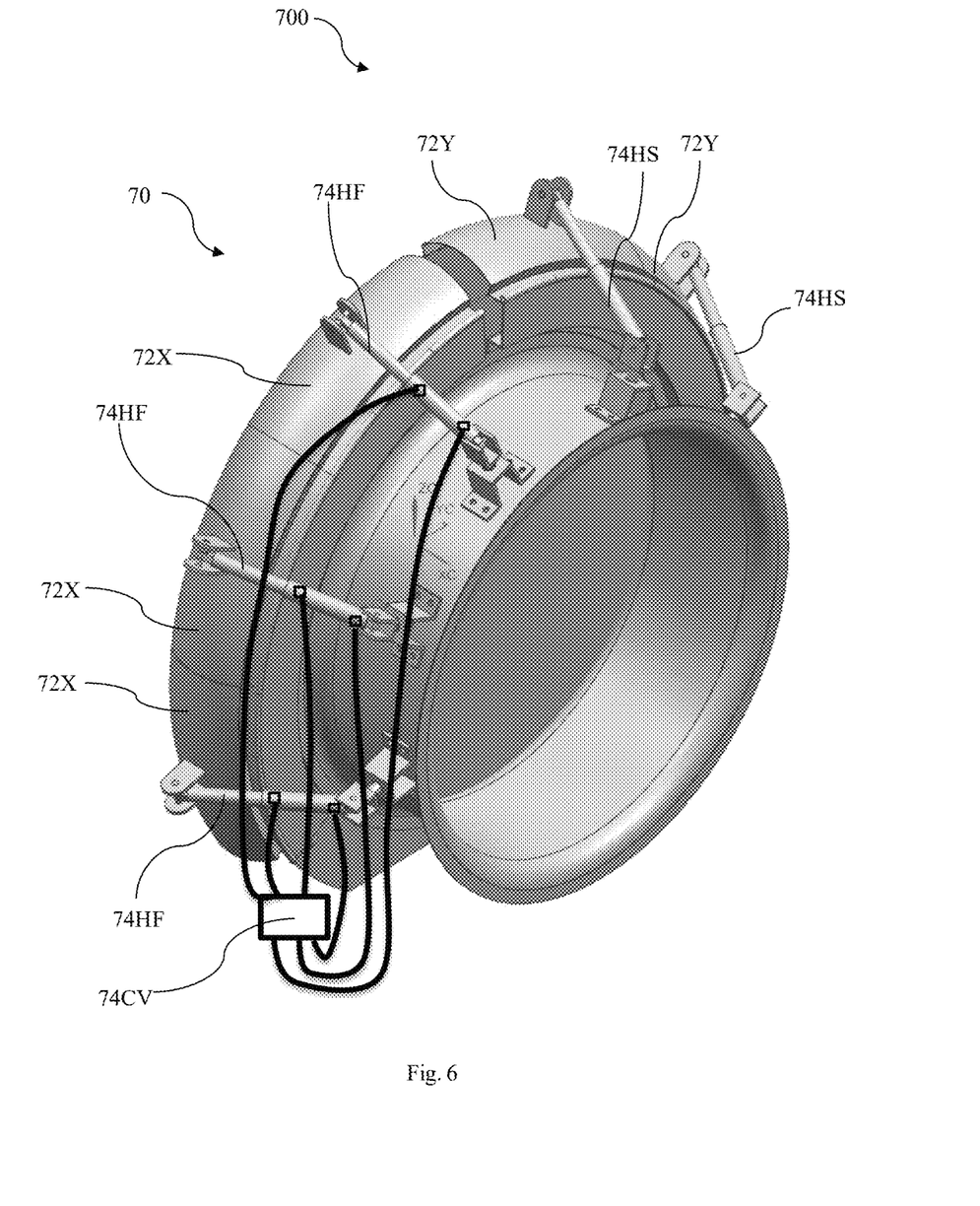

FIG. 6 depicts a schematic view of an agricultural sprayer unit 700 with a spray deflecting mechanism 70, according to another embodiment of the invention as disclosed herein. In another embodiment according to FIG. 6, the spray deflecting mechanism 70 includes a spray deflecting arrangement 72A, a plurality of first actuators 74HF, a plurality of second actuators 74HS, at least one control valve 74CV, at least one collecting means 70T and a plurality of pipes (not shown). In an embodiment according to FIG. 6, the spray deflecting arrangement 72A includes a plurality of first spray deflecting elements 72X and a plurality of second spray deflecting elements 72Y. Each first spray deflecting element 72X and each second spray deflecting element 72Y are adapted to be moved between a deflecting position in which the spray deflecting elements (72X and 72Y) are disposed closer to corresponding sprayer nozzles 704 and adapted to deflect and re-direct unutilized dispensed fluid from corresponding sprayer nozzles 704 to the collecting means 70T, and a stowed position in which the spray deflecting elements (72X and 72Y) are disposed away from corresponding sprayer nozzles 704. Each first spray deflecting element 72X and each second spray deflecting element 72Y are covers provided with concave inner portion adapted to be coated with a surfactant such as hydrophobic agent. It is also within the scope of the invention to coat the concave inner portion of the spray deflecting elements (72X and 72Y) with any other surfactant. Each first spray deflecting element 72X and each second spray deflecting element 72Y are adapted to be hinged to corresponding mounting means (not shown). Each first actuator 74HF is adapted to be coupled to corresponding each first spray deflecting element 72X and provided in communication with the controller unit 703. Each second actuator 74HF is adapted to be coupled to corresponding each second spray deflecting element 72Y and provided in communication with the controller unit 703. The control valve 74CV is provided in fluid communication with the actuators (74HF and 74HS). The control valve 74CV is adapted to regulate fluid flow to the actuators (74HF and 74HS) and each of said actuator (74HF and 74HS) is adapted to move corresponding each spray deflecting element (72X and 72Y) between the deflecting position and the stowed position. Each actuator (74HF and 74HS) is at least one of a hydraulic cylinder and a pneumatic cylinder. The controller unit 703 selectively actuates at least one actuator (74HF and 74HS) through the control valve 74CV based on the information about at least one of type of crop disease, type of disease severity and crop location co-ordinates received through at least one electronic device. In another embodiment, the control valve 74CV is actuated through a manual control arrangement (not shown).

In another embodiment, the spray deflecting mechanism 70 includes a plurality of first actuators (not shown) and a plurality of second actuators (not shown). Each of said first actuator is adapted to be coupled to corresponding each of said first spray deflecting element 72X and provided in communication with a controller unit 703. Each of said second actuator is adapted to be coupled to corresponding each of said second spray deflecting element 72Y and provided in communication with the controller unit 703. Each of said actuator is adapted to move corresponding each of said deflecting element between the deflecting position and the stowed position. Each first actuator and second actuators are at least one of electric motors, electric stepper motors and electric timer motors. The controller unit 703 is configured to receive information about at least one of type of crop disease, type of disease severity and crop location co-ordinates through at least one electronic device and actuate selectively said at least one actuator. In another embodiment, the electric motors are actuated through a manual control arrangement.

Figure 4:
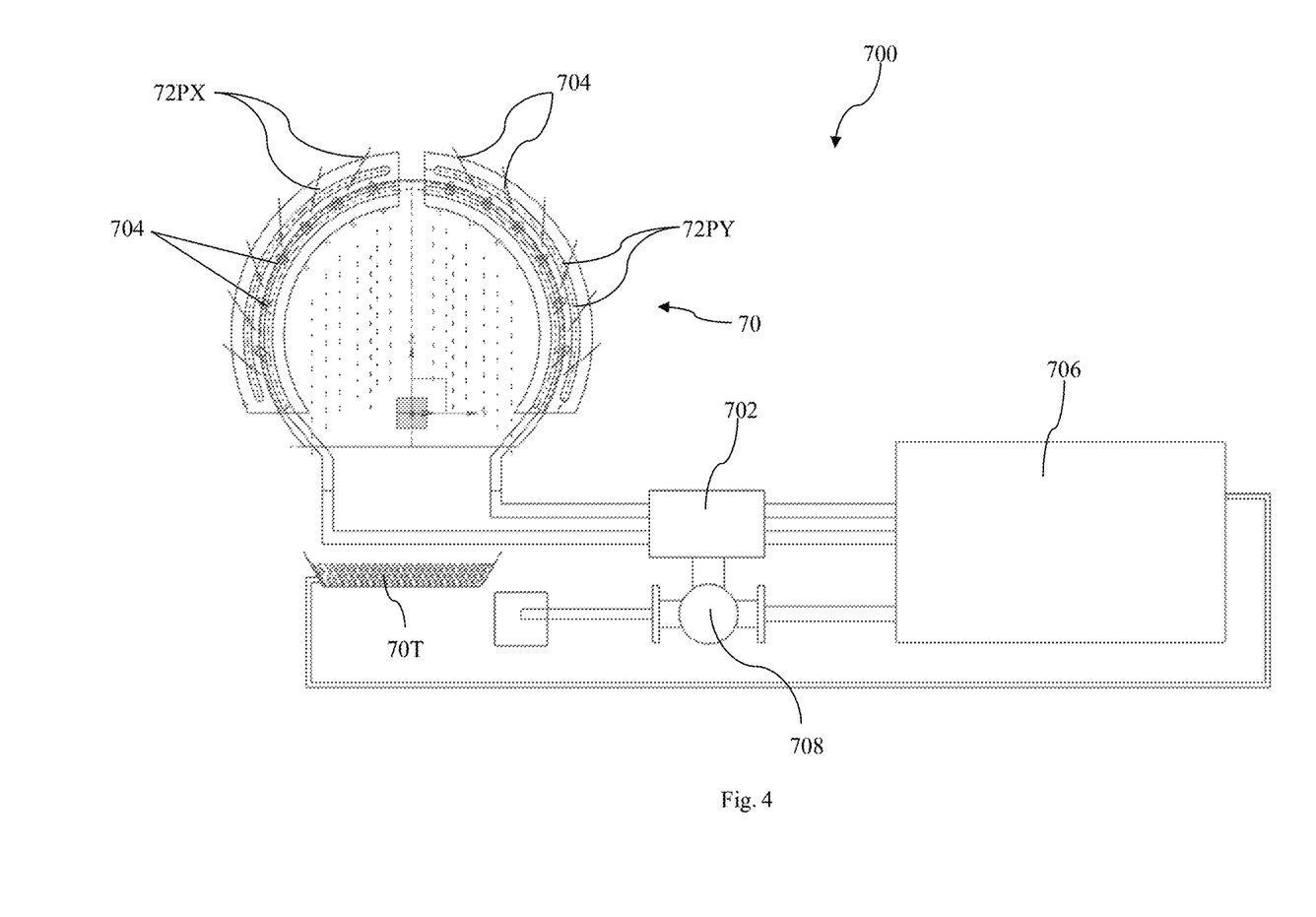

FIG. 4 depicts a schematic view of an agricultural sprayer unit 700 with a spray deflecting mechanism 70, according to another embodiment of the invention as disclosed herein. In another embodiment according to FIG. 4, the spray deflecting mechanism 70 includes a spray deflecting arrangement 72A, an actuator arrangement (not shown), at least one collecting means 70T and a plurality of pipes (not shown). In an embodiment according to FIG. 4, the spray deflecting arrangement 72A includes a plurality of first spray deflecting elements 72PX and a plurality of second spray deflecting elements 72PY (as shown in FIG. 4). The plurality of first spray deflecting elements 72PX are at least plates adapted to be movably connected to a mounting means (not shown) and is moved about corresponding hinge wire (not shown) to move each first spray deflecting plate 72PX to a deflecting position in which each first spray deflecting plate 72PX is adapted to deflect and re-direct unutilized dispensed fluid from corresponding each sprayer nozzle 704 to collecting means 70T. The plurality of second spray deflecting elements 72PY are at least plates adapted to be movably connected to another mounting means (not shown) and is moved about corresponding hinge wire (not shown) to move each second spray deflecting plate 72PY to a deflecting position in which each second spray deflecting plate 72PY is adapted to deflect and re-direct unutilized dispensed fluid from corresponding each sprayer nozzle 704 to collecting means 70T. The actuator arrangement (not shown) is adapted to move each spray deflecting elements (72PX and 72PY) to the deflecting position.

Figure 5:
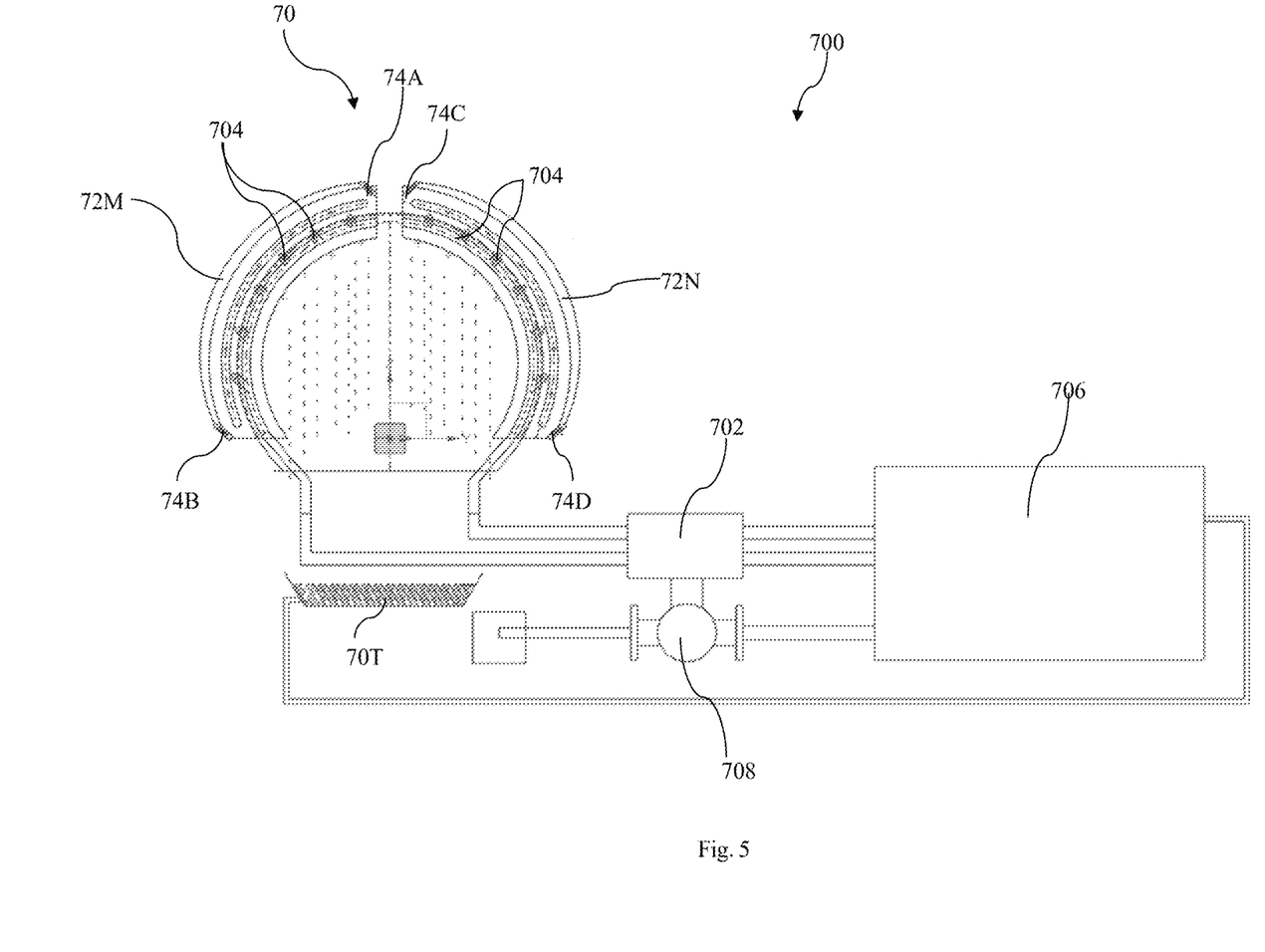

FIG. 5 depicts a schematic view of an agricultural sprayer unit 700 with a spray deflecting mechanism 70, according to another embodiment of the invention as disclosed herein. In another embodiment according to FIG. 5, the spray deflecting mechanism 70 comprises a spray deflecting arrangement 72A, a first resilient means 74A, a second resilient means 72B, a third resilient means 72C and a fourth resilient means 72D, a collecting means 70T and a plurality of pipes (not shown). The spray deflecting arrangement 72A includes a first spray deflecting element 72M and a second spray deflecting element 72N. The first spray deflecting element 72M and second spray deflecting element 72N are flexible baffles adapted to be moved to a deflecting position in which said spray deflecting flexible baffles (72M and 72N) are adapted to deflect and re-direct unutilized dispensed fluid from sprayer nozzles 704 to the collecting means 70T. The resilient means (74A and 74B) are used to maintain the first spray deflecting flexible baffle (72M) at the deflecting position. The resilient means (74C and 74D) are used to maintain the second spray deflecting flexible baffle 72N at the deflecting position. One end of the first resilient means 74A is connected to first spray deflecting flexible baffle (72PX) and another end of the first resilient means 74A is connected to a mounting means (not shown) or to a component of the agricultural sprayer unit 700. One end of second resilient means 74B is connected to another end of the first spray deflecting flexible baffle (72PX) and another end of the second resilient means 74B is connected to the mounting means (not shown) or to a component of the agricultural sprayer unit 700. One end of third resilient means 74C is connected to one end of second spray deflecting flexible baffle 72PY and another end of the third resilient means 74C is connected to another mounting means (not shown) or to a component of the agricultural sprayer unit 700. One end of fourth resilient means 74D is connected to another end of second spray deflecting flexible baffle (72PX) and another end of the first resilient means 74A is connected to the mounting means (not shown) or to a component of the agricultural sprayer unit 700 The resilient means (74A-74D) are at least micro-springs. It is also within the scope of the invention to provide any other means for maintaining each spray deflecting plate (72PX and 74Y) at the deflecting position without otherwise deterring the intended function of the resilient means (74A-74D) as can be deduced from the description and corresponding drawings.

The collecting means (not shown) of the spray deflecting mechanism 70 is adapted to collect the deflected fluid from at least one spray deflecting element (72, 72F, 72S, 72PX, 72PY, 72M, 72N, 72X and 72Y). The collecting means (not shown) is at least a tray. Each pipe (not shown) is adapted to transfer the collected fluid from the collecting means (not shown) to the sprayer fluid tank 706.

In another embodiment, the spray deflecting mechanism 70 includes a spray deflecting element (not shown), at least one collecting means and a plurality of pipes (not shown). The spray deflecting element is at least an extendable and retractable cover adapted to be moved between a deflecting position in which the spray deflecting element is disposed closer to the plurality of sprayer nozzles 704 and adapted to deflect and re-direct unutilized dispensed fluid from said plurality of sprayer nozzles 704 to said collecting means, and a stowed position in which said spray deflecting element is disposed away from said plurality of sprayer nozzles 704. The spray deflecting element 72 is adapted to be movably supported by a mounting means (not shown). The spray deflecting element 72 is provided with a concave inner portion adapted to be coated with a surfactant such as hydrophobic agent.

In another embodiment, the spray deflecting mechanism 70 includes a first spray deflecting element, a second spray deflecting element (not shown), at least one collecting means and a plurality of pipes (not shown). The first and second spray deflecting element are at least extendable and retractable covers adapted to be moved between a deflecting position in which the first and second spray deflecting elements are disposed closer to the plurality of sprayer nozzles 704 and adapted to deflect and re-direct unutilized dispensed fluid from said plurality of sprayer nozzles 704 to said collecting means, and a stowed position in which said first and second spray deflecting elements are disposed away from said plurality of sprayer nozzles 704. The first and second spray deflecting elements are adapted to movably supported by corresponding mounting means. Each spray deflecting element is provided with a concave inner portion adapted to be coated with a surfactant such as hydrophobic agent.

Therefore, an agricultural sprayer unit 700 and a spray deflecting mechanism 70 for deflecting and re-directing unutilized dispensed fluid from sprayer nozzles to a sprayer fluid tank of the agricultural sprayer unit to restrict wastage of chemical agent/biological agent where the spraying is not required and also to restrict spraying of chemical agent/biological agent to healthy plants is provided.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A spray deflecting mechanism for an agricultural sprayer unit comprising a plurality of sprayer nozzles, said mechanism comprising:

a spray deflecting arrangement and at least one collecting means provided in fluid communication with a sprayer fluid tank of said agricultural sprayer unit, wherein said spray deflecting arrangement includes at least one spray deflecting element provided with a concave inner portion coated with a surfactant and said arrangement is adapted to move between a deflecting position in which said spray deflecting arrangement is adapted to deflect and re-direct an unutilized dispensed fluid from said plurality of sprayer nozzles to said collecting means and a stowed position in which said spray deflecting element is disposed away from said plurality of sprayer nozzles.

2. The mechanism as claimed in claim 1, wherein:
said spray deflecting arrangement includes a spray deflecting element, and
said spray deflecting element is at least a cover adapted to move between said deflecting position in which said spray deflecting element is disposed closer to said plurality of sprayer nozzles and adapted to deflect and re-direct said unutilized dispensed fluid from said plurality of sprayer nozzles to said collecting means, and said stowed position in which said spray deflecting element is disposed away from said plurality of sprayer nozzles.

3. The mechanism as claimed in claim 1, wherein:
said spray deflecting arrangement includes a plurality of first spray deflecting elements and a plurality of second spray deflecting elements, and
each of said plurality of first spray deflecting elements and each of said plurality of second spray deflecting elements are covers adapted to move between a deflecting position in which each of said spray deflecting element is disposed closer to said sprayer nozzles and adapted to deflect and re-direct said unutilized dispensed fluid from said sprayer nozzles to said collecting means, and a stowed position in which each of said spray deflecting element is disposed away from said sprayer nozzles.

4. The mechanism as claimed in claim 3, wherein:
each of said plurality of first spray deflecting elements and each of said plurality of second spray deflecting elements are connected to a mounting means; and
each of said plurality of first spray deflecting elements and each of said plurality of second spray deflecting elements are provided with a concave inner portion coated with a surfactant.

5. The mechanism as claimed in claim 4 comprising,
a plurality of first actuators, where each of said plurality of first actuators are adapted to couple to a corresponding first spray deflecting element;
a plurality of second actuators, where each of said plurality of second actuators are adapted to couple to a corresponding second spray deflecting element; and
at least one control valve provided in fluid communication with said plurality of first actuators and said plurality of second actuators,
wherein:
said control valve is adapted to regulate a fluid flow to said plurality of first actuators and said plurality of second actuators; and
each of said plurality of first actuators and each of said plurality of second actuators are adapted to move corresponding first spray deflecting element and second spray deflecting element between the deflecting position and the stowed position.

6. The mechanism as claimed in claim 5, wherein each of said plurality of first actuators and each of said plurality of second actuators are at least one of a hydraulic cylinder and a pneumatic cylinder.

7. A spray deflecting mechanism for an agricultural sprayer unit comprising a plurality of sprayer nozzles, said mechanism comprising:
a spray deflecting arrangement and at least one collecting means provided in fluid communication with a sprayer fluid tank of said agricultural sprayer unit,
said spray deflecting arrangement including a spray deflecting element, wherein
said spray deflecting element is at least a cover adapted to move between a deflecting position in which said spray deflecting element is disposed closer to said plurality of sprayer nozzles and adapted to deflect and re-direct an unutilized dispensed fluid from said plurality of sprayer nozzles to said collecting means, and a stowed position in which said spray deflecting element is disposed away from said plurality of sprayer nozzles;
said spray deflecting element is connected to a mounting means; and
said spray deflecting element is provided with a concave inner portion coated with a surfactant.

8. A spray deflecting mechanism for an agricultural sprayer unit comprising a plurality of sprayer nozzles, said mechanism comprising:
a spray deflecting arrangement and at least one collecting means provided in fluid communication with a sprayer fluid tank of said agricultural sprayer unit;
said spray deflecting arrangement including a first spray deflecting element and a second spray deflecting element, wherein
said first spray deflecting element and said second spray deflecting element are covers adapted to move between a deflecting position in which said first and second spray deflecting elements are disposed closer to said sprayer nozzles and adapted to deflect and re-direct an unutilized dispensed fluid from said sprayer nozzles to said collecting means, and a stowed position in which said first and second spray deflecting elements are disposed away from corresponding sprayer nozzles;
each of said first spray deflecting element and said second spray deflecting element are connected to a mounting means; and
each of said first spray deflecting element and said second spray deflecting element are provided with a concave inner portion coated with a surfactant.

* * * * *